(12) United States Patent
Deng (10) Patent No.: US 10,878,543 B2
(45) Date of Patent: Dec. 29, 2020

(54) GROUP MANAGEMENT METHOD, TERMINAL, AND STORAGE MEDIUM

(71) Applicant: Tencent Technology (Shenzhen) Company Limited, Shenzhen (CN)

(72) Inventor: Haibo Deng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/579,576

(22) Filed: Sep. 23, 2019

(65) Prior Publication Data
US 2020/0020084 A1    Jan. 16, 2020

Related U.S. Application Data

(63) Continuation of application No. 15/709,340, filed on Sep. 19, 2017, now Pat. No. 10,467,734, which is a
(Continued)

(30) Foreign Application Priority Data

Nov. 18, 2015    (CN) .......................... 2015 1 0798982

(51) Int. Cl.
*G06T 5/00* (2006.01)
*H04N 5/243* (2006.01)
(Continued)

(52) U.S. Cl.
CPC ................ *G06T 5/009* (2013.01); *G06K 9/00* (2013.01); *G06K 9/3233* (2013.01); *G06K 9/46* (2013.01);
(Continued)

(58) Field of Classification Search
CPC ........... G06T 5/009; G06T 5/007; G06T 5/40; G06T 5/50; G06T 5/008; G06K 9/00;
(Continued)

(56) References Cited

U.S. PATENT DOCUMENTS 9,424,631 B2 *  8/2016  Moon ..................... G06T 5/007
2007/0297689 A1  12/2007  Neal
(Continued)

FOREIGN PATENT DOCUMENTS

CN    1856013 A    11/2006
CN    1874527 A    12/2006
(Continued)

OTHER PUBLICATIONS

Tencent Technology, ISRWO, PCT/CN2016/081958, dated Jul. 22, 2016, 9 pgs.
(Continued)

*Primary Examiner* — Wesley J Tucker
(74) *Attorney, Agent, or Firm* — Morgan, Lewis & Bockius LLP (57) ABSTRACT

A real-time video enhancement method performed at a terminal includes: obtaining an average luminance of a current frame of an image; determining a first enhancement curve corresponding to the current frame from a mapping relationship between a luminance range and the first enhancement curve according to the average luminance of the current frame; determining a local enhancement curve of the current frame according to a pixel range of the current frame; determining a second enhancement curve of the current frame according to the local enhancement curve of the current frame and the first enhancement curve of the current frame; and adjusting the current frame according to the second enhancement curve.

20 Claims, 5 Drawing Sheets

Related U.S. Application Data continuation-in-part of application No. PCT/CN2016/081958, filed on May 13, 2016.

(51) Int. Cl.
  G06K 9/46   (2006.01)
  G06K 9/32   (2006.01)
  G06K 9/00   (2006.01)
  G06T 5/40   (2006.01)
  G06T 5/50   (2006.01)
  H04N 5/14   (2006.01)

(52) U.S. Cl.
  CPC ............ G06K 9/4652 (2013.01); G06T 5/007 (2013.01); G06T 5/40 (2013.01); G06T 5/50 (2013.01); H04N 5/243 (2013.01); G06K 9/00228 (2013.01); H04N 5/147 (2013.01)

(58) Field of Classification Search
  CPC ...... G06K 9/4652; G06K 9/3233; G06K 9/46; G06K 9/00228; H04N 5/243; H04N 5/147; H04N 5/21
  See application file for complete search history.

(56) References Cited

U.S. PATENT DOCUMENTS

| | | |
|---|---|---|
| 2008/0123984 A1 | 5/2008 | Xie |
| 2010/0080459 A1 | 4/2010 | Dai et al. |
| 2010/0085361 A1* | 4/2010 | Kim ..................... G06T 5/008 345/428 |
| 2011/0181787 A1 | 7/2011 | Wang et al. |
| 2013/0083248 A1 | 4/2013 | Suzuki |
| 2014/0092012 A1 | 4/2014 | Seshadrinathan et al. |
| 2016/0232419 A1* | 8/2016 | Bai ..................... G06T 5/007 |
| 2016/0360173 A1* | 12/2016 | Tao ..................... H04N 5/265 |
| 2017/0127063 A1 | 5/2017 | Li et al. |
| 2018/0330674 A1 | 11/2018 | Baar et al. |
| 2019/0043176 A1* | 2/2019 | Li ..................... G06T 5/40 |

FOREIGN PATENT DOCUMENTS

| | | |
|---|---|---|
| CN | 101052100 A | 10/2007 |
| CN | 101340511 A | 1/2009 |
| CN | 101340512 A | 1/2009 |
| CN | 101646091 A | 2/2010 |
| CN | 102625030 A | 8/2012 |
| CN | 105407296 A | 3/2016 |
| EP | 0654943 A2 | 3/2007 |
| JP | 2004007301 A | 1/2004 |
| JP | 2008118608 A | 5/2008 |
| JP | WO2009063553 A1 | 3/2011 |
| JP | 2012049657 A | 3/2012 |
| JP | 2013077999 A | 4/2013 |
| KR | 20070030019 A | 3/2007 |

OTHER PUBLICATIONS

Tencent Technology, IPRP, PCT/CN2016/081958, dated May 22, 2018, 8 pgs.

* cited by examiner

GROUP MANAGEMENT METHOD, TERMINAL, AND STORAGE MEDIUM

CROSS-REFERENCE TO RELATED APPLICATIONS

This application is a continuation of U.S. patent application Ser. No. 15/709,340, entitled "GROUP MANAGEMENT METHOD, TERMINAL AND STORAGE MEDIUM", filed on Sep. 19, 2017, which is continuation-in-part application of PCT/CN2016/081958, entitled "REAL-TIME VIDEO ENHANCEMENT METHOD, TERMINAL, AND NON-VOLATILE COMPUTER READABLE STORAGE MEDIUM" filed on May 13, 2016, which claims priority to Chinese Patent Application No. 201510798982.8, filed with the State Intellectual Property Office of the People's Republic of China on Nov. 18, 2015, and entitled "REAL-TIME VIDEO ENHANCEMENT METHOD AND DEVICE", all of which are incorporated herein by reference in their entirety.

FIELD OF THE TECHNOLOGY

The present disclosure relates to the field of signal processing, and in particular to, a real-time video enhancement method, a terminal, and a non-transitory computer readable storage medium.

BACKGROUND OF THE DISCLOSURE

Currently, an overwhelming majority of smartphones already have a video shooting function. Because limitations are imposed on lenses and costs, the luminous flux on a single pixel is relatively small. Particularly, in an indoor scenario in which illumination is insufficient or illuminance is low, exposure of some mobile phones is insufficient to cause an obviously dark video, and use of a video call is limited. By means of video enhancement processing, a video effect in this type of scenario may be effectively improved, so as to improve a subjective feeling of a customer, thereby expanding a video call application scenario.

A conventional video enhancement technology mainly uses image enhancement for reference. For example, in a histogram equalization manner, an enhancement curve is a cumulative probability distribution function of an image, and can stretch the contrast of the entire image to a maximum extent. Because a histogram of an image in a dark scenario has a peak, the image is excessively enhanced after histogram equalization processing, and consequently the image is distorted.

SUMMARY

Based on this, it is necessary to provide a real-time video enhancement method. Moreover, it is further necessary to provide a terminal and a non-transitory computer readable storage medium.

A first aspect of the present disclosure is a real-time video enhancement method performed at a terminal having one or more processors and memory storing one or more programs to be executed by the one or more processors including the following operations:

obtaining an average luminance of a current frame of an image;

determining a first enhancement curve corresponding to the current frame from a mapping relationship between a luminance range and the first enhancement curve according to the average luminance of the current frame;

determining a local enhancement curve of the current frame according to a pixel range of the current frame;

determining a second enhancement curve of the current frame according to the local enhancement curve of the current frame and the first enhancement curve of the current frame; and adjusting the current frame according to the second enhancement curve. A second aspect of the present disclosure is a terminal having one or more processors, memory and one or more programs stored in the memory that, when executed by the one or more processors, cause the terminal to perform the aforementioned real-time video enhancement method.

A third aspect of the present disclosure is a non-transitory computer readable storage medium storing one or more programs that, when executed by one or more processors of a terminal for performing real-time video enhancement, cause the terminal to perform the aforementioned real-time video enhancement method.

Details of one or more embodiments of the present invention are put forward in the following accompanying drawings and descriptions. Other characteristics, objectives, and advantages of the present disclosure become obvious according to the specification, the accompanying drawings, and the claims.

BRIEF DESCRIPTION OF THE DRAWINGS

To describe the technical solutions of the embodiments of the present invention or the existing technology more clearly, the accompanying drawings for illustrating the embodiments or the existing technology will be introduced briefly in the following. Apparently, the accompanying drawings in the following description are only some embodiments of the present invention, and a person of ordinary skill in the art may obtain other accompanying drawings based on these accompanying drawings without creative efforts.

DESCRIPTION OF EMBODIMENTS

To make objectives, technical solutions and advantages of the present disclosure more understandable and comprehensible, the present disclosure is further described in detail below with reference to accompanying drawings and embodiments. It should be understood that, specific embodiments described herein are merely used for explaining the present disclosure, but not used for limiting the present disclosure.

Figure 1:
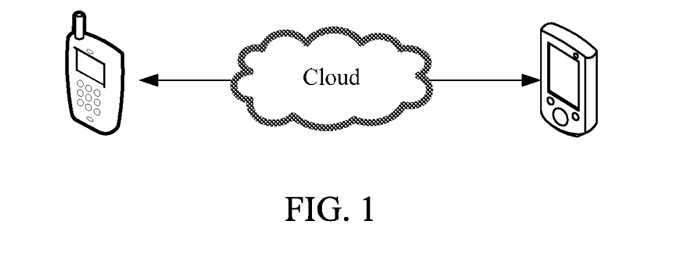
FIG. 1 is a schematic diagram of an application environment of a real-time video enhancement method according to some embodiments of the present disclosure.

FIG. 1 is a schematic diagram of an application environment of a real-time video enhancement method according to some embodiments of the present disclosure. The application environment may include one or more terminals. The real-time video enhancement method may be applied to video enhancement processing in a video shooting function of a terminal or video enhancement processing in a real-time streaming media service, or may be applied to video enhancement processing of a real-time video call performed between multiple terminals. FIG. 1 is an application environment in which two terminals perform a real-time video call. This is only an example, and the present disclosure is not limited thereto. In other embodiments, data may be transmitted between multiple terminals by using a server.

Figure 2:
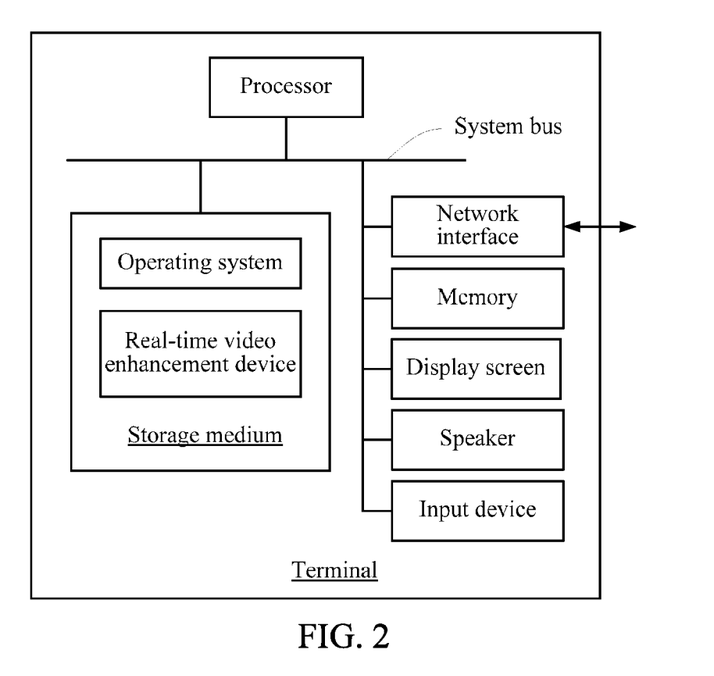
FIG. 2 is a schematic diagram of an internal structure of a terminal in FIG. 1 according to some embodiments of the present disclosure.

FIG. 2 is a schematic diagram of an internal structure of a terminal in FIG. 1 according to some embodiments of the present disclosure. As shown in FIG. 2, the terminal includes a processor, a storage medium, a memory, a network interface, a voice collecting device, a display screen, a speaker, and an input device that are connected by using a system bus. The storage medium of the terminal stores an operating system, and further includes a real-time video enhancement device, and the real-time video enhancement device is used to implement a real-time video enhancement method. The processor is used to provide a calculating and control capability, and supports running of the entire terminal. The memory in the terminal provides an environment for running of the real-time video enhancement device in the storage medium, the network interface is used to perform network communication with a server or another terminal, for example, send data to a server or terminal, or receive data returned by a server or terminal. The display screen of the terminal may be a crystal liquid display screen or an electronic ink display screen, and the input device may be a touch layer covering the display screen, or may be a key, a track ball, or a touchpad disposed on a terminal housing, or may be an external keyboard, touchpad, mouse, or the like. The terminal may be a mobile phone, a tablet computer, or a personal digital assistant. A person skilled in the art may understand that, the structure shown in FIG. 2 is only a block diagram of a partial structure related to this application solution, and does not constitute any limitation to a terminal to which this application solution is applied. Specifically, the terminal may include more or fewer parts than those shown in the figure, or some parts are combined, or different part deployment is performed.

Figure 3:
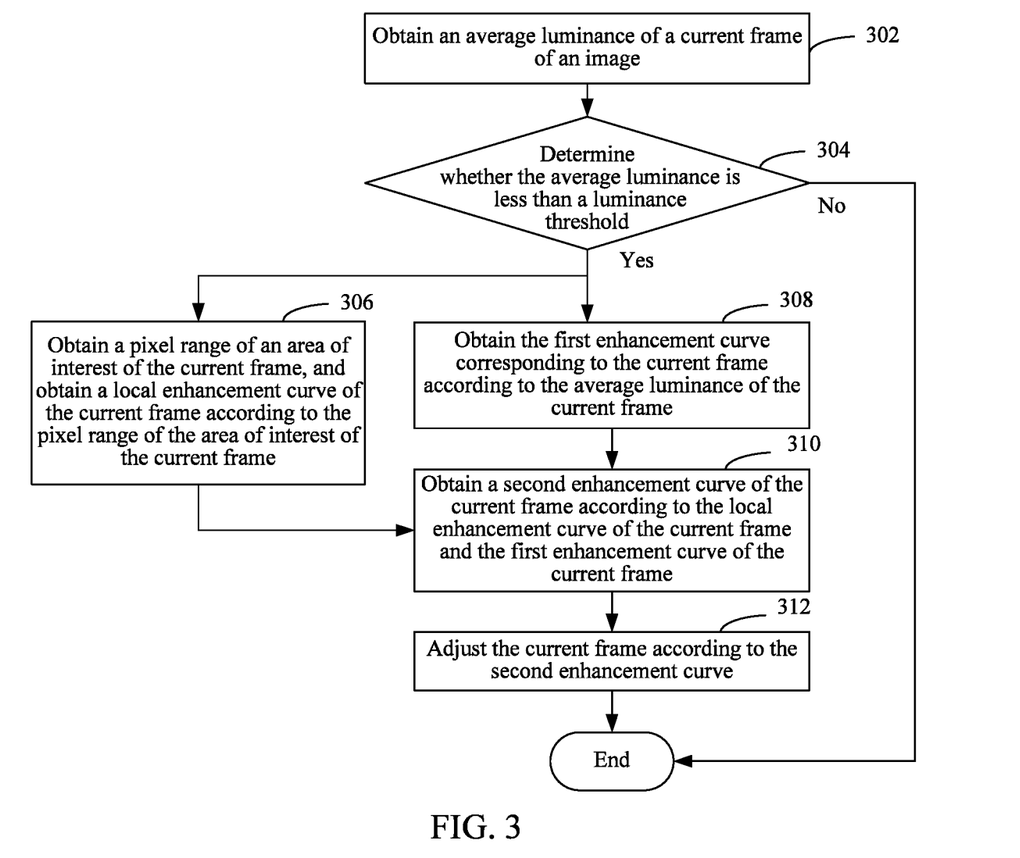
FIG. 3 is a flowchart of a real-time video enhancement method according to some embodiments of the present disclosure.

FIG. 3 is a flowchart of a real-time video enhancement method according to some embodiments of the present disclosure. As shown in FIG. 3, a real-time video enhancement method includes the following operations:

Operation 302: Obtain an average luminance of a current frame of an image.

Specifically, an image of a real-time video is obtained, then luminance values of the pixel points of a current frame of the image are obtained, and then an average value of luminance values of the pixel points is calculated to obtain an average luminance of the current frame of the image.

Operation 304: Determine whether the average luminance is less than a luminance threshold; and if yes, perform operation 306; or if not, the process ends.

Specifically, when the scenario is dark, the average pixel value of the entire image is relatively low. Generally, ⅓ of a brightest value is used as the luminance threshold. If the average luminance is less than the luminance threshold, it is considered that the image is dark, and enhancement processing needs to be performed on the image. When the average luminance is greater than or equal to the luminance threshold, enhancement processing is not needed.

Operation 306: Obtain a pixel range of an area of interest of the current frame, and obtain a local enhancement curve of the current frame according to the pixel range of the area of interest of the current frame.

Specifically, the upper limit of the pixel range of the area of interest of the current frame is a first preset percentage greater than a total pixel quantity of a pixel upper limit and less than or equal to a total pixel quantity, and the lower limit of the pixel range is a second preset percentage less than a total pixel quantity of a pixel lower limit and less than or equal to the total pixel quantity. The first preset percentage and the second preset percentage may be adjusted according to needs, and in this embodiment, the first preset percentage and the second preset percentage are both one percent.

For example, in a YUV space, a luminance component Y and a chrominance component UV are separated, and only the Y component is processed, to maintain UV color information. A value range of an image gray-scale is [0, 255]. The pixel range of the area of interest of the current frame is [$T_{low}$, $T_{high}$] Assuming that a pixel quantity of the current frame is pixNum a gray-scale histogram Hist of the current frame is calculated, and the lower limit $T_{low}$ and the upper limit $T_{high}$ of the pixel range satisfy:

$$\sum_{i=0}^{T_{low}} Hist(i) \leq 0.01 * pixNum \quad \text{formula (1)}$$

$$\sum_{i=T_{high}}^{255} Hist(i) \leq 0.01 * pixNum \quad \text{formula (2)}$$

Figure 4:
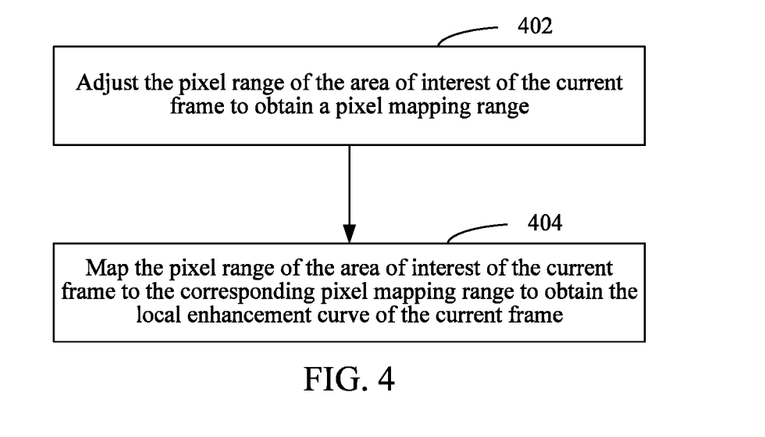
FIG. 4 is a specific flowchart of an operation of obtaining a local enhancement curve of a current frame according to a pixel range of an area of interest of the current frame according to some embodiments of the present disclosure.

In an embodiment, as shown in FIG. 4, the operation of determining a local enhancement curve of the current frame according to the pixel range of the area of interest of the current frame includes:

Operation 402: Adjust the pixel range of the area of interest of the current frame to obtain a pixel mapping range.

Specifically, the area of interest is set according to a specific application scenario. For example, in a video call scenario, the area of interest is a human face. In some embodiments, a face recognition algorithm is applied to an image frame such as the current image frame for identifying the human face in the image frame. In some other embodiments, a motion tracking algorithm is applied to the real-time video for detecting the area of interest. For example, the real-time video may capture a person or a dog walking in a room and the area of interest is mainly focused on the walking person or dog for enhance purpose.

When a difference between an upper limit value and a lower limit value of the pixel range of the area of interest of the current frame is less than a preset value, an upper limit value of the pixel mapping range is a preset percentage of the upper limit value of the pixel range of the area of interest of the current frame, and a lower limit value of the pixel mapping range is a preset percentage of the lower limit value of the pixel range of the area of interest of the current frame.

When a difference between an upper limit value and a lower limit value of the pixel range of the area of interest of the current frame is greater than or equal to a preset value, an upper limit value of the pixel mapping range is 255, and a lower limit value of the pixel mapping range is 0.

Specifically, the pixel mapping range [$T_{low}'$, $T_{high}'$] is determined. If a dynamic pixel range is excessively small, over-enhancement occurs when direct mapping to [0, 255] is performed, and therefore the pixel mapping range needs to be adjusted.

$$T_{low}' = \begin{cases} T_{low} * 0.5 & \text{if } T_{high} - T_{low} < 255 * 0.5 \\ 0 & \text{otherwise} \end{cases} \quad \text{formula (3)}$$

$$T_{high}' = \begin{cases} T_{high} * 0.5 & \text{if } T_{high} - T_{low} < 255 * 0.5 \\ 255 & \text{otherwise} \end{cases} \quad \text{formula (4)}$$

The preset percentage of the upper limit value of the pixel range of the area of interest of the current frame and the preset percentage of the lower limit value of the pixel range of the area of interest of the current frame may be set according to needs. For example, the foregoing preset percentages are both 0.5, that is, 50%.

Operation 404: Map the pixel range of the area of interest of the current frame to the corresponding pixel mapping range to obtain the local enhancement curve of the current frame.

Specifically, operation 404 includes: obtaining a ratio of a difference between an upper limit value and a lower limit value of the pixel mapping range to a difference between an upper limit value and a lower limit value of the pixel range of the area of interest of the current frame; and multiplying a difference between each value in the pixel range of the area of interest of the current frame and the lower limit value of the pixel range of the area of interest of the current frame by the ratio, and then adding the multiplied difference to the lower limit value of the pixel range of the area of interest of the current frame, to obtain the local enhancement curve of the current frame.

Pixels in the pixel range [$T_{low}$, $T_{high}$] are uniformly mapped to the pixel mapping range [$T_{low}'$, $T_{high}'$], to obtain the local enhancement curve L1 of the current frame.

$$L1(i) = (T_{high}' - T_{low}')/(T_{high} - T_{low}) * (i - T_{low}) + T_{low}', i \in [T_{low}, T_{high}] \quad \text{formula (5)}$$

Operation 308: Obtain the first enhancement curve corresponding to the current frame according to the average luminance of the current frame.

Specifically, a mapping relationship between a luminance range and the first enhancement curve is first established. For the first enhancement curve, the contrast of a dark pixel needs to be improved, and the contrast of a bright pixel needs to be suppressed. The first enhancement curve has a pixel value slope greater than 1 in a dark area, and has a pixel value slope less than 1 in a bright area. The dark area is generally an area in which an image pixel value is less than one third of the brightest value. The bright area is an area in which an image pixel value is greater than two third of the brightest value. The brightest value is a highest pixel value. For example, a highest pixel value of a pixel value stored in 8 bits is 255. The contrast is a difference between a current pixel and a surrounding pixel. The first enhancement curve is a mapping function, a horizontal coordinate denotes a current pixel value x, and a vertical coordinate denotes a pixel value L(x) after mapping. After a pixel of the dark area is mapped by means of the first enhancement curve, the contrast of the dark area increases, and the contrast of the bright area decreases. For example, for a pixel, if the contrast of the pixel is $k*(x_0-x_1)$, the contrast of the pixel is $k*(L(x_0)-L(x_1))$ by means of mapping. For two pixel points that are quite close, the contrast may be approximately $k*L*(x_0-x_1)$. For the dark area, L>1, and the contrast increases; for the bright area, L<1, and the contrast decreases.

A group of first enhancement curves are configured for each luminance range. The first enhancement curve is an empirical value obtained according to statistics collected on a large quantity of videos.

Figure 5:
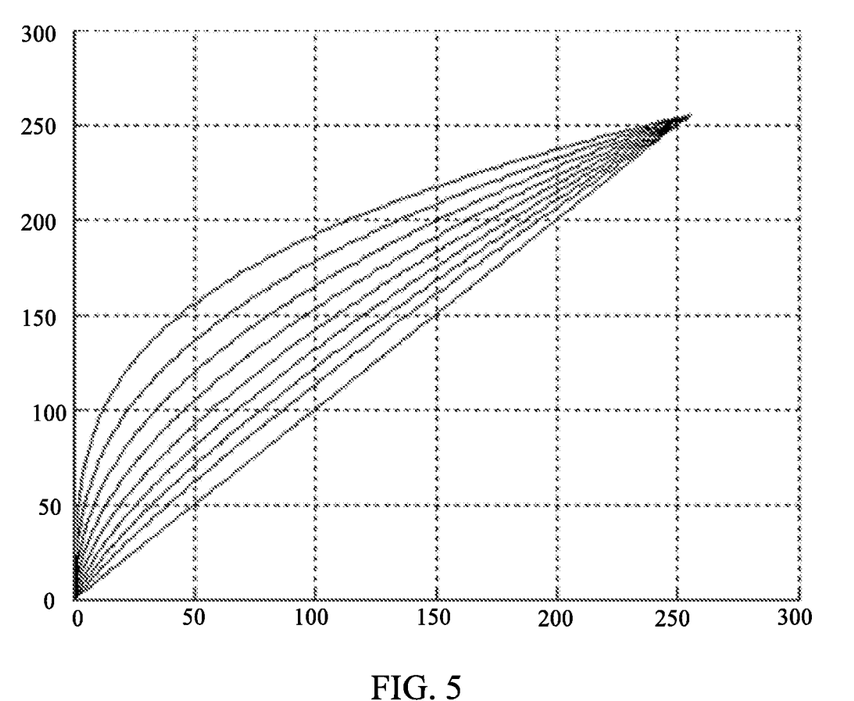
FIG. 5 is a schematic diagram of multiple groups of first enhancement curves according to design of a scenario from darkness to brightness.

FIG. 5 is a schematic diagram of multiple groups of first enhancement curves according to design of a scenario from darkness to brightness. As shown in FIG. 5, a darker average luminance of an image indicates a larger slope of an enhancement curve in a dark area, and a smaller slope of the enhancement curve in a bright area. In FIG. 5, the average luminance of an image corresponding to the first enhancement curve from bottom up gradually increases. Multiple groups of first enhancement curves are designed, and smooth switching may be performed when the video luminance changes.

The operation of determining a first enhancement curve corresponding to the current frame according to the average luminance of the current frame includes: obtaining the first enhancement curve corresponding to the current frame from the mapping relationship between the luminance range and the first enhancement curve according to the average luminance of the current frame.

Specifically, the average luminance of the current frame is compared with the luminance range, the luminance range in which the average luminance of the current frame is located is determined, and then the corresponding first enhancement curve L0 is found according to the mapping relationship between the luminance range and the first enhancement curve.

Operation 310: Obtain a second enhancement curve of the current frame according to the local enhancement curve of the current frame and the first enhancement curve of the current frame.

Specifically, arithmetic averaging or weighted averaging is performed on the local enhancement curve of the current frame and the first enhancement curve of the current frame to obtain the second enhancement curve of the current frame.

A formula of performing arithmetic averaging on the local enhancement curve of the current frame and the first enhancement curve of the current frame is L2=(L0+L1)/2. L2 is the second enhancement curve.

A formula of performing weighted averaging on the local enhancement curve of the current frame and the first enhancement curve of the current frame is L2=(aL0+bL1)/(a+b), where a and b are positive numbers.

Operation 312: Adjust the current frame according to the second enhancement curve.

Specifically, a horizontal coordinate of the second enhancement curve is a current pixel value of a pixel point in the current frame, and a vertical coordinate is a pixel value of an adjusted pixel point in the current frame.

In the foregoing real-time video enhancement method, it is determined that the average luminance of the current frame is less than the luminance threshold, the pixel range of the area of interest of the current frame is obtained, the local enhancement curve is obtained, the corresponding first enhancement curve is obtained according to the average luminance, the second enhancement curve of the current frame is obtained according to the first enhancement curve and the local enhancement curve, the current frame is adjusted according to the second enhancement curve, and comprehensive processing is performed by using the first enhancement curve and the local enhancement curve, so as to prevent the image from being excessively enhanced, and prevent image distortion. Moreover, the calculating amount is quite small, and no additional storage space is needed, so as to be suitable for real-time video enhancement processing.

Figure 6:
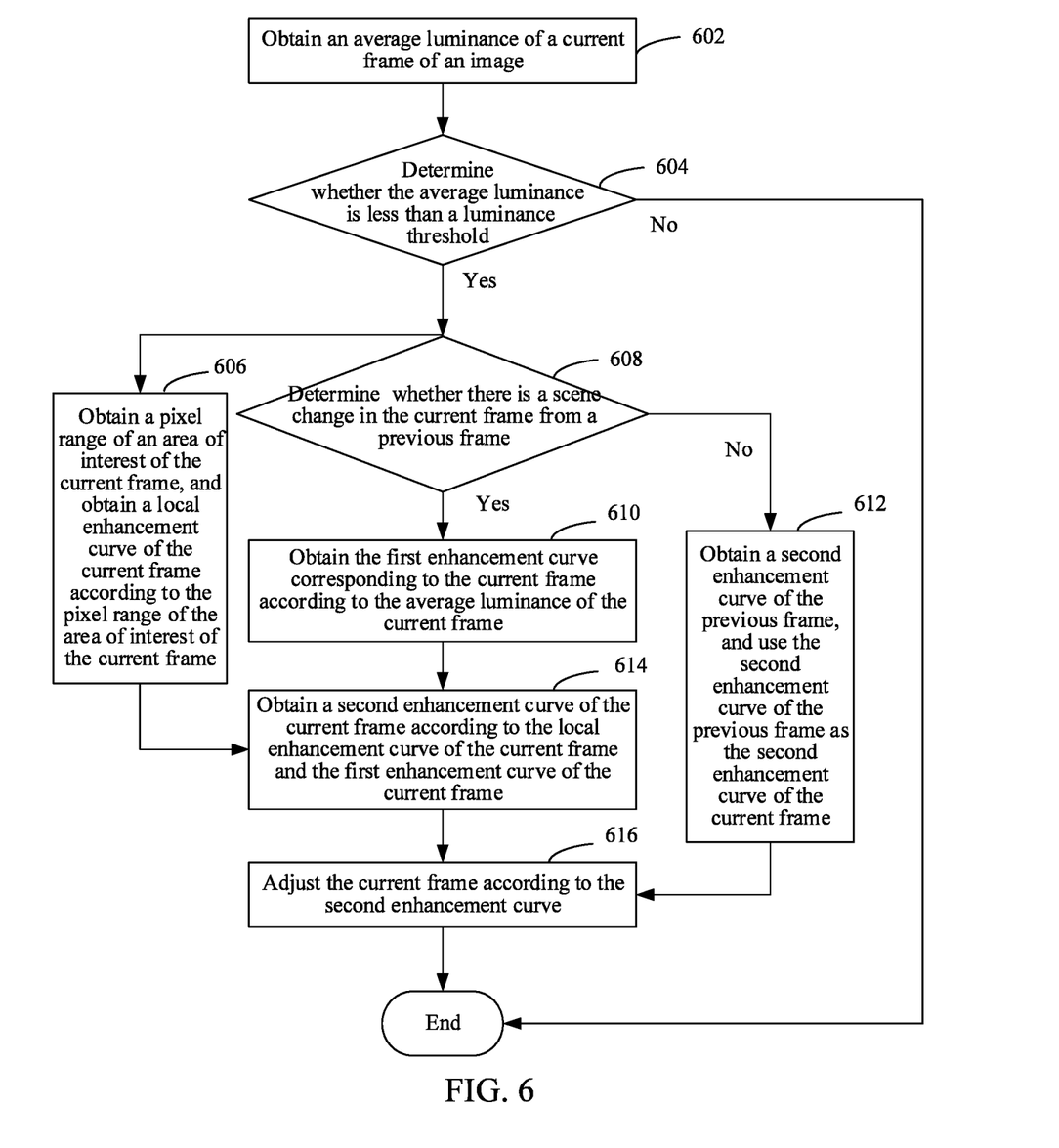
FIG. 6 is a flowchart of a real-time video enhancement method according to some other embodiments of the present disclosure.

FIG. 6 is a flowchart of a real-time video enhancement method according to some other embodiments of the present disclosure. As shown in FIG. 6, a real-time video enhancement method includes the following operations:

Operation 602: Obtain an average luminance of a current frame of an image.

Specifically, luminance values of pixel points of the current frame of the image are obtained, and then an average value of luminance values of the pixel points is calculated to obtain an average luminance of the current frame of the image.

Operation 604: Determine whether the average luminance is less than a luminance threshold; and if yes, perform operation 306; or if not, the process ends.

Specifically, when the scenario is dark, the average pixel value of the entire image is relatively low. Generally, ⅓ of a brightest value is used as the luminance threshold. If the average luminance is less than the luminance threshold, it is considered that the image is dark, and enhancement processing needs to be performed on the image. When the average luminance is greater than or equal to the luminance threshold, enhancement processing is not needed.

Operation 606: Obtain a pixel range of an area of interest of the current frame, and obtain a local enhancement curve of the current frame according to the pixel range of the area of interest of the current frame.

Specifically, the upper limit of the pixel range of the area of interest of the current frame is a first preset percentage greater than a total pixel quantity of a pixel upper limit and less than or equal to a total pixel quantity, and the lower limit of the pixel range is a second preset percentage less than a total pixel quantity of a pixel lower limit and less than or equal to the total pixel quantity. The first preset percentage and the second preset percentage may be adjusted according to needs, and in this embodiment, the first preset percentage and the second preset percentage are both one percent.

For example, in a YUV space, a luminance component Y and a chrominance component UV are separated, and only the Y component is processed, to maintain UV color information. A value range of an image gray-scale is [0, 255] The pixel range of the area of interest of the current frame is $[T_{low}, T_{high}]$ Assuming that a pixel quantity of the current frame is PixNum a gray-scale histogram Hist of the current frame is calculated, and the lower limit $T_{low}$ and the upper limit $T_{high}$ of the pixel range satisfy:

$$\sum_{i=0}^{T_{low}} Hist(i) \leq 0.01 * pixNum \quad \text{formula (1)}$$

$$\sum_{i=T_{high}}^{255} Hist(i) \leq 0.01 * pixNum \quad \text{formula (2)}$$

The operation of determining a local enhancement curve of the current frame according to the pixel range of the area of interest of the current frame includes: adjusting the pixel range of the area of interest of the current frame to obtain a pixel mapping range; and mapping the pixel range of the area of interest of the current frame to the corresponding pixel mapping range to obtain the local enhancement curve of the current frame.

The operation of adjusting the pixel range of the area of interest of the current frame to obtain a pixel mapping range includes: when a difference between an upper limit value and a lower limit value of the pixel range of the area of interest of the current frame is less than a preset value, an upper limit value of the pixel mapping range is a preset percentage of the upper limit value of the pixel range of the area of interest of the current frame, and a lower limit value of the pixel mapping range is a preset percentage of the lower limit value of the pixel range of the area of interest of the current frame.

When a difference between an upper limit value and a lower limit value of the pixel range of the area of interest of the current frame is greater than or equal to a preset value, an upper limit value of the pixel mapping range is 255, and a lower limit value of the pixel mapping range is 0.

Specifically, the pixel mapping range $[T_{low}', T_{high}']$ is determined. If a dynamic pixel range is excessively small, over-enhancement occurs when direct mapping to [0, 255] is performed, and therefore the pixel mapping range needs to be adjusted.

$$T_{low}' = \begin{cases} T_{low} * 0.5 & \text{if } T_{high} - T_{low} < 255 * 0.5 \\ 0 & \text{otherwise} \end{cases} \quad \text{formula (3)}$$

$$T_{high}' = \begin{cases} T_{high} * 0.5 & \text{if } T_{high} - T_{low} < 255 * 0.5 \\ 255 & \text{otherwise} \end{cases} \quad \text{formula (4)}$$

The preset percentage of the upper limit value of the pixel range of the area of interest of the current frame and the preset percentage of the lower limit value of the pixel range of the area of interest of the current frame may be set according to needs. For example, the foregoing preset percentages are both 0.5, that is, 50%.

The operation of mapping the pixel range of the area of interest of the current frame to the corresponding pixel mapping range to obtain the local enhancement curve of the current frame includes: obtaining a ratio of a difference between an upper limit value and a lower limit value of the pixel mapping range to a difference between an upper limit value and a lower limit value of the pixel range of the area of interest of the current frame; and multiplying a difference between each value in the pixel range of the area of interest of the current frame and the lower limit value of the pixel range of the area of interest of the current frame by the ratio, and then adding the multiplied difference to the lower limit value of the pixel range of the area of interest of the current frame, to obtain the local enhancement curve of the current frame.

Pixels in the pixel range $[T_{low}, T_{high}]$ are uniformly mapped to the pixel mapping range $[T_{low}', T_{high}']$ to obtain the local enhancement curve L1 of the current frame.

$$L1(i)=(T_{high}'-T_{low}')/(T_{high}-T_{low})*(i-T_{low})+T_{low}'; i \in [T_{low}, T_{high}] \quad \text{formula (5)}$$

Operation 608: Determine whether there is a scene change in the current frame from a previous frame; and if yes, perform operation 610; and if not, perform operation 612.

Specifically, whether the scenario is unchanged may be determined by obtaining the average luminance of the current frame. The average luminance of the current frame is compared with an average luminance of a previous frame or previous several frames; and if a difference between the average luminance of the current frame and the average luminance of the previous frame or the previous several frames is less than an error threshold, it is considered that the scenario is unchanged, or if greater than or equal to the error threshold, it is considered that the scenario is changed. For example, the average luminance of the previous frame is 120, the average luminance of the current frame is 121, and the error threshold is 4. Therefore, the difference between the average luminance of the current frame and the average luminance of the previous frame is 1, and is less than the error threshold, and therefore it is considered that the scenario is unchanged.

Operation 610: Obtain a second enhancement curve of the previous frame, use the second enhancement curve of the previous frame as the second enhancement curve of the current frame, and then perform operation 616.

Operation 612: Obtain a first enhancement curve corresponding to the current frame according to the average luminance of the current frame, and then perform operation 614.

Specifically, a mapping relationship between a luminance range and the first enhancement curve is first established. For the first enhancement curve, the contrast of a dark pixel needs to be improved, and the contrast of a bright pixel needs to be suppressed. The first enhancement curve has a pixel value slope greater than 1 in a dark area, and has a pixel value slope less than 1 in a bright area. The dark area is generally an area in which an image pixel value is less than one third of the brightest value. The bright area is an area in which an image pixel value is greater than two third of the brightest value. The brightest value is a highest pixel value. For example, a highest pixel value of a pixel value stored in 8 bits is 255. The contrast is a difference between a current pixel and a surrounding pixel. The first enhancement curve is a mapping function, a horizontal coordinate denotes a current pixel value x, and a vertical coordinate denotes a pixel value L(x) after mapping. After a pixel of the dark area is mapped by means of the first enhancement curve, the contrast of the dark area increases, and the contrast of the bright area decreases. For example, for a pixel, if the contrast of the pixel is $k^*(x_0-x_1)$, the contrast of the pixel is $k^*(L(x_0)-L(x_1))$ by means of mapping. For two pixel points that are quite close, the contrast may be approximately $k^*L^*(x_0-x_1)$. For the dark area, L>1, and the contrast increases; for the bright area, L<1, and the contrast decreases.

A group of first enhancement curves are configured for each luminance range. The first enhancement curve is an empirical value obtained according to statistics collected on a large quantity of videos.

The operation of determining a first enhancement curve corresponding to the current frame according to the average luminance of the current frame includes: obtaining the first enhancement curve corresponding to the current frame from the mapping relationship between the luminance range and the first enhancement curve according to the average luminance of the current frame.

Specifically, the average luminance of the current frame is compared with the luminance range, the luminance range in which the average luminance of the current frame is located is determined, and then the corresponding first enhancement curve L0 is found according to the mapping relationship between the luminance range and the first enhancement curve.

Operation 614: Obtain a second enhancement curve of the current frame according to the local enhancement curve of the current frame and the first enhancement curve of the current frame.

Specifically, arithmetic averaging or weighted averaging is performed on the local enhancement curve of the current frame and the first enhancement curve of the current frame to obtain the second enhancement curve of the current frame.

A formula of performing arithmetic averaging on the local enhancement curve of the current frame and the first enhancement curve of the current frame is L2=(L0+L1)/2 L2 is the second enhancement curve.

A formula of performing weighted averaging on the local enhancement curve of the current frame and the first enhancement curve of the current frame is L2=(aL0+bL1)/(a+b), where a and b are positive numbers.

Operation 616: Adjust the current frame according to the second enhancement curve.

Specifically, a horizontal coordinate of the second enhancement curve is a current pixel value of a pixel point in the current frame, and a vertical coordinate is a pixel value of an adjusted pixel point in the current frame.

In the foregoing real-time video enhancement method, it is determined that the average luminance of the current frame is less than the luminance threshold, the pixel range of the area of interest of the current frame is obtained, the local enhancement curve is obtained, the corresponding first enhancement curve is obtained according to the average luminance, the second enhancement curve of the current frame is obtained according to the first enhancement curve and the local enhancement curve, the current frame is adjusted according to the second enhancement curve, and comprehensive processing is performed by using the first enhancement curve and the local enhancement curve, so as to prevent the image from being excessively enhanced, and prevent image distortion. The calculating amount is quite small, and no additional storage space is needed, so as to be suitable for real-time video enhancement processing. When the scenario is unchanged and the second enhancement curve exists in the previous frame, the current frame is also adjusted by using the second enhancement curve of the previous frame, so as to further reduce the calculating amount, and greatly reduce the quantity of switching times, so that a processed neighboring frame is more natural, and no blinking occurs.

Figure 7:
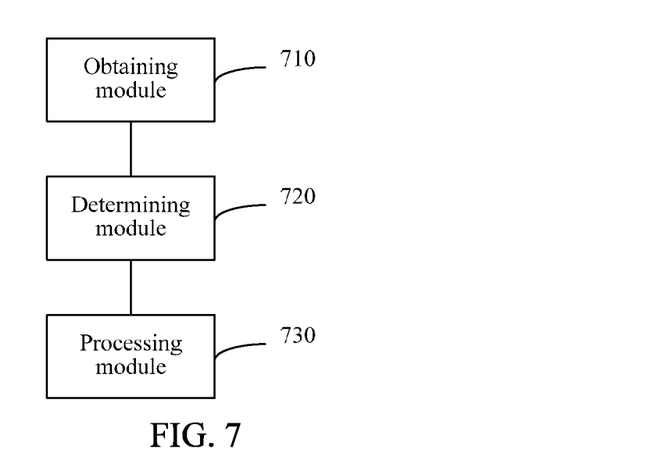
FIG. 7 is a structural block diagram of a real-time video enhancement device according to some embodiments of the present disclosure.

FIG. 7 is a structural block diagram of a real-time video enhancement device according to some embodiments of the present disclosure. As shown in FIG. 7, a real-time video enhancement device includes an obtaining module 710, a determining module 720, and a processing module 730.

The obtaining module 710 is configured to obtain an average luminance of a current frame of an image. Specifically, luminance values of pixel points of the current frame of the image are obtained, and then an average value of luminance values of the pixel points is calculated to obtain an average luminance of the current frame of the image.

The determining module 720 is configured to determine whether the average luminance is less than a luminance threshold. If yes, the processing module 730 is configured to: obtain a pixel range of an area of interest of the current frame; obtain a local enhancement curve of the current frame according to the pixel range of the area of interest of the current frame; obtain the first enhancement curve corresponding to the current frame according to the average luminance of the current frame; and obtain a second enhancement curve of the current frame according to the local enhancement curve of the current frame and the first enhancement curve of the current frame, and adjust the current frame according to the second enhancement curve; or if not, the process ends.

Specifically, when the scenario is dark, the average pixel value of the entire image is relatively low. Generally, ⅓ of a brightest value is used as the luminance threshold. If the average luminance is less than the luminance threshold, it is considered that the image is dark, and enhancement processing needs to be performed on the image. When the average luminance is greater than or equal to the luminance threshold, enhancement processing is not needed.

The upper limit of the pixel range of the area of interest of the current frame is a first preset percentage greater than a total pixel quantity of a pixel upper limit and less than or equal to a total pixel quantity, and the lower limit of the pixel range is a second preset percentage less than a total pixel quantity of a pixel lower limit and less than or equal to the total pixel quantity. The first preset percentage and the second preset percentage may be adjusted according to needs, and in this embodiment, the first preset percentage and the second preset percentage are both one percent, but are not limited thereto.

For example, in a YUV space, a luminance component Y and a chrominance component UV are separated, and only the Y component is processed, to maintain UV color information. A value range of an image gray-scale is [0, 255]. The pixel range of the area of interest of the current frame is $[T_{low}, T_{high}]$ Assuming that a pixel quantity of the current frame is pixNum a gray-scale histogram Hist of the current frame is calculated, and the lower limit $T_{low}$ and the upper limit $T_{high}$ of the pixel range satisfy:

$$\sum_{i=0}^{T_{low}} Hist(i) \leq 0.01 * pixNum \quad \text{formula (1)}$$

$$\sum_{i=T_{high}}^{255} Hist(i) \leq 0.01 * pixNum \quad \text{formula (2)}$$

The processing module 730 is further configured to adjust the pixel range of the area of interest of the current frame to obtain a pixel mapping range; and map the pixel range of the area of interest of the current frame to the corresponding pixel mapping range to obtain the local enhancement curve of the current frame.

Specifically, the area of interest is set according to a specific application scenario. For example, in a video call scenario, the area of interest is a human face.

When a difference between an upper limit value and a lower limit value of the pixel range of the area of interest of the current frame is less than a preset value, an upper limit value of the pixel mapping range is a preset percentage of the upper limit value of the pixel range of the area of interest of the current frame, and a lower limit value of the pixel mapping range is a preset percentage of the lower limit value of the pixel range of the area of interest of the current frame.

When a difference between an upper limit value and a lower limit value of the pixel range of the area of interest of the current frame is greater than or equal to a preset value, an upper limit value of the pixel mapping range is 255, and a lower limit value of the pixel mapping range is 0.

Specifically, the pixel mapping range $[T_{low}', T_{high}']$ is determined. If a dynamic pixel range is excessively small, over-enhancement occurs when direct mapping to [0, 255] is performed, and therefore the pixel mapping range needs to be adjusted.

$$T_{low}' = \begin{cases} T_{low} * 0.5 & \text{if } T_{high} - T_{low} < 255 * 0.5 \\ 0 & \text{otherwise} \end{cases} \quad \text{formula (3)}$$

$$T_{high}' = \begin{cases} T_{high} * 0.5 & \text{if } T_{high} - T_{low} < 255 * 0.5 \\ 255 & \text{otherwise} \end{cases} \quad \text{formula (4)}$$

The preset percentage of the upper limit value of the pixel range of the area of interest of the current frame and the preset percentage of the lower limit value of the pixel range of the area of interest of the current frame may be set according to needs. For example, the foregoing preset percentages are both 0.5, that is, 50%.

The processing module 730 is further configured to obtain a ratio of a difference between an upper limit value and a lower limit value of the pixel mapping range to a difference between an upper limit value and a lower limit value of the pixel range of the area of interest of the current frame; and multiply a difference between each value in the pixel range of the area of interest of the current frame and the lower limit value of the pixel range of the area of interest of the current frame by the ratio, and then add the multiplied difference to the lower limit value of the pixel range of the area of interest of the current frame, to obtain the local enhancement curve of the current frame.

Pixels in the pixel range $[T_{low}, T_{high}]$ are uniformly mapped to the pixel mapping range $[T_{low}', T_{high}']$ to obtain the local enhancement curve L1 of the current frame.

$$L1(i) = (T_{high}' - T_{low}')/(T_{high} - T_{low}) * (i - T_{low}) + T_{low}'; \ i \in [T_{low}, T_{high}] \quad \text{formula (5)}$$

A mapping relationship between a luminance range and the first enhancement curve is established first. For the first enhancement curve, the contrast of a dark pixel needs to be improved, and the contrast of a bright pixel needs to be suppressed. The first enhancement curve has a pixel value slope greater than 1 in a dark area, and has a pixel value slope less than 1 in a bright area. The dark area is generally an area in which an image pixel value is less than one third of the brightest value. The bright area is an area in which an image pixel value is greater than two third of the brightest value.

The brightest value is a highest pixel value. For example, a highest pixel value of a pixel value stored in 8 bits is 255. The contrast is a difference between a current pixel and a surrounding pixel. The first enhancement curve is a mapping function, a horizontal coordinate denotes a current pixel value x, and a vertical coordinate denotes a pixel value L(x) after mapping. After a pixel of the dark area is mapped by means of the first enhancement curve, the contrast of the dark area increases, and the contrast of the bright area decreases. For example, for a pixel, if the contrast of the pixel is $k*(x_0-x_1)$, the contrast of the pixel is $k*(L(x_0)-L(x_1))$ by means of mapping. For two pixel points that are quite close, the contrast may be approximately $k*L*(x_0-x_1)$. For the dark area, L>1, and the contrast increases; for the bright area, L<1, and the contrast decreases.

A group of first enhancement curves are configured for each luminance range. The first enhancement curve is an empirical value obtained according to statistics collected on a large quantity of videos.

The obtaining, by the processing module 730, the first enhancement curve corresponding to the current frame according to the average luminance of the current frame includes: obtaining the first enhancement curve corresponding to the current frame from the mapping relationship between the luminance range and the first enhancement curve according to the average luminance of the current frame.

Specifically, the average luminance of the current frame is compared with the luminance range, the luminance range in which the average luminance of the current frame is located is determined, and then the corresponding first enhancement curve L0 is found according to the mapping relationship between the luminance range and the first enhancement curve.

Arithmetic averaging or weighted averaging is performed on the local enhancement curve of the current frame and the first enhancement curve of the current frame to obtain the second enhancement curve of the current frame.

A formula of performing arithmetic averaging on the local enhancement curve of the current frame and the first enhancement curve of the current frame is $L2=(L+L1)/2$. $L2$ is the second enhancement curve.

A formula of performing weighted averaging on the local enhancement curve of the current frame and the first enhancement curve of the current frame is $L2=(aL0+bL1)/(a+b)$, where a and b are positive numbers.

A horizontal coordinate of the second enhancement curve is a current pixel value of a pixel point in the current frame, and a vertical coordinate is a pixel value of an adjusted pixel point in the current frame.

In the foregoing real-time video enhancement device, it is determined that the average luminance of the current frame is less than the luminance threshold, the pixel range of the area of interest of the current frame is obtained, the local enhancement curve is obtained, the corresponding first enhancement curve is obtained according to the average luminance, the second enhancement curve of the current frame is obtained according to the first enhancement curve and the local enhancement curve, the current frame is adjusted according to the second enhancement curve, and comprehensive processing is performed by using the first enhancement curve and the local enhancement curve, so as to prevent the image from being excessively enhanced, and prevent image distortion. Moreover, the calculating amount is quite small, and no additional storage space is needed, so as to be suitable for real-time video enhancement processing.

In an embodiment, the determining module 720 is further configured to: before determining the first enhancement curve corresponding to the current frame according to the average luminance of the current frame, determine whether there is a scene change in the current frame from a previous frame; and if no, the processing module 730 is further configured to obtain a second enhancement curve of the previous frame, and use the second enhancement curve of the previous frame as the second enhancement curve of the current frame; or if yes, the processing module 730 obtains the first enhancement curve corresponding to the current frame according to the average luminance of the current frame.

In the foregoing real-time video enhancement device, it is determined that the average luminance of the current frame is less than the luminance threshold, the pixel range of the area of interest of the current frame is obtained, the local enhancement curve is obtained, the corresponding first enhancement curve is obtained according to the average luminance, the second enhancement curve of the current frame is obtained according to the first enhancement curve and the local enhancement curve, the current frame is adjusted according to the second enhancement curve, and comprehensive processing is performed by using the first enhancement curve and the local enhancement curve, so as to prevent the image from being excessively enhanced, and prevent image distortion. The calculating amount is quite small, and no additional storage space is needed, so as to be suitable for real-time video enhancement processing. When the scenario is unchanged and the second enhancement curve exists in the previous frame, the current frame is also adjusted by using the second enhancement curve of the previous frame, so as to further reduce the calculating amount, and greatly reduce the quantity of switching times, so that a processed neighboring frame is more natural, and no blinking occurs.

Figure 8:
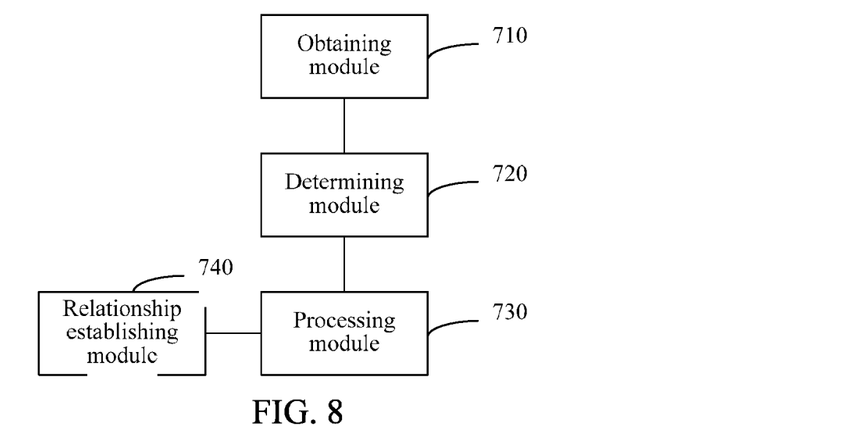
FIG. 8 is a structural block diagram of a real-time video enhancement device according to some other embodiments of the present disclosure.

FIG. 8 is a structural block diagram of a real-time video enhancement device according to some other embodiments of the present disclosure. As shown in FIG. 8, in addition to an obtaining module 710, a determining module 720, and a processing module 730, a real-time video enhancement device further includes a relationship establishing module 740.

The relationship establishing module 740 is configured to establish a mapping relationship between a luminance range and the first enhancement curve. A group of first enhancement curves are configured for each luminance range. The first enhancement curve is an empirical value obtained according to statistics collected on a large quantity of videos.

The processing module 730 is further configured to obtain the first enhancement curve corresponding to the current frame from the mapping relationship between the luminance range and the first enhancement curve according to the average luminance of the current frame.

Specifically, the average luminance of the current frame is compared with the luminance range, the luminance range in which the average luminance of the current frame is located is determined, and then the corresponding first enhancement curve L0 is found according to the mapping relationship between the luminance range and the first enhancement curve.

A person of ordinary skill in the art may understand that all or some of the procedures of the methods of the foregoing embodiments may be implemented by a computer program instructing relevant hardware. The program may be stored in a non-transitory computer readable storage medium. When the program is executed, the program may include the procedures of the embodiments of the foregoing methods. The storage medium may be a magnetic disk, an optical disc, a read-only memory (ROM), or the like.

The above embodiments only express several implementations of the present disclosure, which are described specifically and in detail, and therefore cannot be construed as a limitation to the patent scope of the present disclosure. It should be noted that, a person of ordinary skill in the art may make several deformations and improvements without departing from the idea of the present disclosure. All such deformations and improvements fall within the protection scope of the present disclosure. Therefore, the patent protection scope of the present disclosure shall be subject to the appended claims.

What is claimed is:

1. A real-time video enhancement method performed at a terminal having one or more processors and memory storing one or more programs to be executed by the one or more processors, the method comprising:
    obtaining an average luminance of a current frame of an image;

determining a first enhancement curve corresponding to the current frame from a mapping relationship between a luminance range and the first enhancement curve according to the average luminance of the current frame;

determining a local enhancement curve of the current frame according to a pixel range of the current frame;

determining a second enhancement curve of the current frame according to the local enhancement curve of the current frame and the first enhancement curve of the current frame; and adjusting the current frame according to the second enhancement curve.

2. The method according to claim 1, further comprising:
before determining the first enhancement curve corresponding to the current frame according to the average luminance of the current frame:
  determining whether there is a scene change in the current frame from a previous frame; and
  in accordance with a determination that there is no scene change, obtaining a second enhancement curve of the previous frame, and using the second enhancement curve of the previous frame as the second enhancement curve of the current frame; and
  in accordance with a determination that there is scene change, determining the first enhancement curve corresponding to the current frame according to the average luminance of the current frame.

3. The method according to claim 2, wherein the operation of determining whether there is a scene change in the current frame from a previous frame comprises:
  obtaining an average luminance of multiple previous frames before the current frame;
  comparing the average luminance of the current frame with the average luminance of the multiple previous frames;
  determining that there is a scene change in the current frame from the multiple previous frames in accordance with a determination that a difference between the average luminance of the current frame and the average luminance of the multiple previous frames is greater than an error threshold; and
  determining that there is no scene change in the current frame from the multiple previous frames in accordance with a determination that the difference between the average luminance of the current frame and the average luminance of the multiple previous frames is no greater than the error threshold.

4. The method according to claim 1, further comprising:
identifying an area of interest of the current frame; and
obtaining a pixel range of the identified area of interest of the current frame, wherein the operation of determining a local enhancement curve of the current frame comprises:
  obtaining the local enhancement curve of the current frame according to the pixel range of the area of interest of the current frame.

5. The method according to claim 4, further comprising:
adjusting the pixel range of the area of interest of the current frame to obtain a pixel mapping range; and
mapping the pixel range of the area of interest of the current frame to the corresponding pixel mapping range to obtain the local enhancement curve of the current frame.

6. The method according to claim 5, wherein the operation of adjusting the pixel range of the area of interest of the current frame to obtain a pixel mapping range comprises:

when a difference between an upper limit value and a lower limit value of the pixel range of the area of interest of the current frame is less than a preset value, setting an upper limit value of the pixel mapping range to be a preset percentage of the upper limit value of the pixel range of the area of interest of the current frame, and setting a lower limit value of the pixel mapping range to be a preset percentage of the lower limit value of the pixel range of the area of interest of the current frame.

7. The method according to claim 5, wherein the operation of mapping the pixel range of the area of interest of the current frame to the corresponding pixel mapping range to obtain the local enhancement curve of the current frame comprises:
  obtaining a ratio of a difference between an upper limit value and a lower limit value of the pixel mapping range to a difference between an upper limit value and a lower limit value of the pixel range of the area of interest of the current frame; and
  multiplying a difference between each value in the pixel range of the area of interest of the current frame and the lower limit value of the pixel range of the area of interest of the current frame by the ratio, and then adding the multiplied difference to the lower limit value of the pixel range of the area of interest of the current frame, to obtain the local enhancement curve of the current frame.

8. The method according to claim 1, wherein the operation of determining a second enhancement curve of the current frame according to the local enhancement curve of the current frame and the first enhancement curve of the current frame comprises:
  performing arithmetic averaging or weighted averaging on the local enhancement curve of the current frame and the first enhancement curve of the current frame to obtain the second enhancement curve of the current frame.

9. The method according to claim 1, wherein the current frame is an image frame extracted from the real-time video.

10. The method according to claim 1, wherein the real-time video is related to a video call and the area of interest of the current frame is a facial region of a participant of the video call.

11. A terminal for performing real-time video enhancement having one or more processors, memory and one or more programs stored in the memory that, when executed by the one or more processors, cause the terminal to perform a plurality of operations including:
  obtaining an average luminance of a current frame of an image;
  determining a first enhancement curve corresponding to the current frame from a mapping relationship between a luminance range and the first enhancement curve according to the average luminance of the current frame;
  determining a local enhancement curve of the current frame according to a pixel range of the current frame;
  determining a second enhancement curve of the current frame according to the local enhancement curve of the current frame and the first enhancement curve of the current frame; and
  adjusting the current frame according to the second enhancement curve.

12. The terminal according to claim 11, wherein the plurality of operations include:

before determining the first enhancement curve corresponding to the current frame according to the average luminance of the current frame:
   determining whether there is a scene change in the current frame from a previous frame; and
   in accordance with a determination that there is no scene change, obtaining a second enhancement curve of the previous frame, and using the second enhancement curve of the previous frame as the second enhancement curve of the current frame; and
   in accordance with a determination that there is scene change, determining the first enhancement curve corresponding to the current frame according to the average luminance of the current frame.

13. The terminal according to claim 12, wherein the operation of determining whether there is a scene change in the current frame from a previous frame comprises:
   obtaining an average luminance of multiple previous frames before the current frame;
   comparing the average luminance of the current frame with the average luminance of the multiple previous frames;
   determining that there is a scene change in the current frame from the multiple previous frames in accordance with a determination that a difference between the average luminance of the current frame and the average luminance of the multiple previous frames is greater than an error threshold; and
   determining that there is no scene change in the current frame from the multiple previous frames in accordance with a determination that the difference between the average luminance of the current frame and the average luminance of the multiple previous frames is no greater than the error threshold.

14. The terminal according to claim 11, wherein the plurality of operations include:
   identifying an area of interest of the current frame; and
   obtaining a pixel range of the identified area of interest of the current frame, wherein the operation of determining a local enhancement curve of the current frame comprises:
      obtaining the local enhancement curve of the current frame according to the pixel range of the area of interest of the current frame.

15. The terminal according to claim 14, wherein the plurality of operations include:
   adjusting the pixel range of the area of interest of the current frame to obtain a pixel mapping range; and
   mapping the pixel range of the area of interest of the current frame to the corresponding pixel mapping range to obtain the local enhancement curve of the current frame.

16. The terminal according to claim 15, wherein the operation of adjusting the pixel range of the area of interest of the current frame to obtain a pixel mapping range comprises:
   when a difference between an upper limit value and a lower limit value of the pixel range of the area of interest of the current frame is less than a preset value, setting an upper limit value of the pixel mapping range to be a preset percentage of the upper limit value of the pixel range of the area of interest of the current frame, and setting a lower limit value of the pixel mapping range to be a preset percentage of the lower limit value of the pixel range of the area of interest of the current frame.

17. The terminal according to claim 15, wherein the operation of mapping the pixel range of the area of interest of the current frame to the corresponding pixel mapping range to obtain the local enhancement curve of the current frame comprises:
   obtaining a ratio of a difference between an upper limit value and a lower limit value of the pixel mapping range to a difference between an upper limit value and a lower limit value of the pixel range of the area of interest of the current frame; and
   multiplying a difference between each value in the pixel range of the area of interest of the current frame and the lower limit value of the pixel range of the area of interest of the current frame by the ratio, and then adding the multiplied difference to the lower limit value of the pixel range of the area of interest of the current frame, to obtain the local enhancement curve of the current frame.

18. The terminal according to claim 11, wherein the operation of determining a second enhancement curve of the current frame according to the local enhancement curve of the current frame and the first enhancement curve of the current frame comprises:
   performing arithmetic averaging or weighted averaging on the local enhancement curve of the current frame and the first enhancement curve of the current frame to obtain the second enhancement curve of the current frame.

19. The terminal according to claim 11, wherein the current frame is an image frame extracted from the real-time video.

20. A non-transitory computer readable storage medium storing one or more programs that, when executed by one or more processors of a terminal for performing real-time video enhancement, cause the terminal to perform a plurality of operations including:
   obtaining an average luminance of a current frame of an image;
   determining a first enhancement curve corresponding to the current frame from a mapping relationship between a luminance range and the first enhancement curve according to the average luminance of the current frame;
   determining a local enhancement curve of the current frame according to a pixel range of the current frame;
   determining a second enhancement curve of the current frame according to the local enhancement curve of the current frame and the first enhancement curve of the current frame; and
   adjusting the current frame according to the second enhancement curve.

* * * * *